(12) United States Patent
Naito et al.

(10) Patent No.: US 10,406,663 B2
(45) Date of Patent: Sep. 10, 2019

(54) DETACHMENT TOOL AND MOTOR DRIVE DEVICE PROVIDED WITH THE SAME

(71) Applicant: FANUC CORPORATION, Yamanashi (JP)

(72) Inventors: Genzo Naito, Yamanashi (JP); Kazuhiro Yamamoto, Yamanashi (JP); Minoru Kataoka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 4 days.

(21) Appl. No.: 15/371,625

(22) Filed: Dec. 7, 2016

(65) Prior Publication Data

US 2017/0165821 A1      Jun. 15, 2017

(30) Foreign Application Priority Data

Dec. 10, 2015   (JP) .................................. 2015-240904

(51) Int. Cl.
*B25B 27/02* (2006.01)
*B23Q 3/18* (2006.01)
(Continued)

(52) U.S. Cl.
CPC .......... *B25B 27/023* (2013.01); *B23Q 1/0054* (2013.01); *B23Q 3/18* (2013.01); *B25B 33/00* (2013.01); *Y10T 29/53913* (2015.01)

(58) Field of Classification Search
CPC ....... B25B 27/023; B25B 27/16; B25B 27/14; B25B 33/00; B66F 2700/04;
(Continued)

(56) References Cited

U.S. PATENT DOCUMENTS 1,940,910 A    12/1933  Hickey
2,295,996 A *  9/1942  Lauffenburger ... B23K 37/0408
                                                 29/271
(Continued)

FOREIGN PATENT DOCUMENTS

CN    103537896 A    1/2014
CN    206383066 U    8/2017
(Continued)

OTHER PUBLICATIONS

English Abstract and Machine Translation for Japanese Publication No. 2004-200662 A, published Jul. 15, 2004, 9 pgs.
(Continued)

*Primary Examiner* — Tyrone V Hall, Jr.
(74) *Attorney, Agent, or Firm* — Fredrikson & Byron, P.A.

(57) ABSTRACT

A detachment tool of the present invention is a tool for detaching a device attached to a wall portion. The detachment tool includes a member in which a first through hole and a second through hole are formed, a first screw that fixes the member to the device while inserted into the first through hole, and a second screw that pushes the wall portion while inserted into the second through hole. The first through hole is a threaded hole that screw-engages with the first screw or an unthreaded hole. The second through hole is a threaded hole that screw-engages with the second screw. According to such a configuration, the detachment tool in which operationality in detachment is good, flexible adaptation to a space can be made, and force applied in detachment is also easily managed, and a motor drive device provided with the same can be provided.

5 Claims, 12 Drawing Sheets

(51) Int. Cl.
B23Q 1/00 (2006.01)
B25B 33/00 (2006.01)

(58) Field of Classification Search
CPC .. Y10T 403/73; Y10T 29/53913; F16B 12/56; B23Q 1/0054; B23Q 3/18; B23Q 3/183; B23Q 3/186; B23P 19/10
See application file for complete search history.

(56) References Cited

U.S. PATENT DOCUMENTS

| | | | | |
|---|---|---|---|---|
| 3,739,451 | A * | 6/1973 | Jacobson | B25B 27/16 285/27 |
| 4,133,231 | A * | 1/1979 | Corona | B23B 31/00 82/142 |
| 4,161,068 | A * | 7/1979 | McMaster | G01B 11/27 33/412 |
| 4,586,647 | A | 5/1986 | Dearman | |
| 4,606,107 | A | 8/1986 | Theofanous | |
| 4,611,947 | A * | 9/1986 | Baus | A47K 3/34 403/104 |
| 4,771,528 | A * | 9/1988 | Stromberg | B25B 27/023 29/259 |
| 4,800,817 | A * | 1/1989 | Carstensen | E01B 29/20 104/15 |
| 4,868,965 | A * | 9/1989 | Drymon | B25B 27/0035 29/259 |
| 4,989,312 | A * | 2/1991 | Maddalena | B25B 27/023 29/259 |
| 5,004,017 | A * | 4/1991 | White | F16L 1/26 138/106 |
| 5,125,146 | A * | 6/1992 | Ferrari | B23K 37/0443 29/402.08 |
| 5,228,181 | A * | 7/1993 | Ingle | B25B 27/16 228/44.5 |
| 5,297,482 | A * | 3/1994 | Cleveland | E01B 29/16 104/2 |
| 5,425,169 | A | 6/1995 | Steinman et al. | |
| 5,575,416 | A * | 11/1996 | Oellerer | E01B 29/46 228/212 |
| 5,621,957 | A * | 4/1997 | Herrera | B25B 27/023 29/264 |
| 5,664,392 | A * | 9/1997 | Mucha | E04B 2/96 248/262 |
| 6,012,211 | A * | 1/2000 | Ochoa | B25B 27/02 29/244 |
| 6,058,588 | A * | 5/2000 | Wadensten | B25B 27/14 29/256 |
| 6,166,467 | A | 12/2000 | Tsai et al. | |
| 6,305,061 | B1 * | 10/2001 | King | B25B 27/023 29/259 |
| 6,502,293 | B1 * | 1/2003 | Khurana | B25B 27/02 29/260 |
| 6,560,836 | B1 * | 5/2003 | Briscoe | B25B 27/023 29/259 |
| 7,120,983 | B2 * | 10/2006 | Jarema | B23Q 3/18 29/464 |
| 8,850,679 | B2 * | 10/2014 | Bender | B25B 5/147 269/43 |
| 9,808,922 | B2 * | 11/2017 | Breschi | B25B 27/24 |
| 2002/0190172 | A1 * | 12/2002 | Oddsen, Jr. | F16M 11/24 248/289.11 |
| 2012/0174363 | A1 * | 7/2012 | Shen | B25B 27/023 29/253 |
| 2015/0000091 | A1 * | 1/2015 | Bender | B25B 5/147 29/272 |

FOREIGN PATENT DOCUMENTS

| | | |
|---|---|---|
| JP | 58105190 U | 7/1983 |
| JP | 612838 U | 2/1994 |
| JP | 8107658 A | 4/1996 |
| JP | 2004200662 A | 7/2004 |
| JP | 20065094 A | 1/2006 |
| JP | 200661941 A | 3/2006 |
| JP | 2013161995 A | 8/2013 |
| JP | 2015163002 A | 9/2015 |

OTHER PUBLICATIONS

English Abstract and Machine Translation for Japanese Publication No. 2006-061941 A, published Mar. 9, 2006, 11 pgs.
English Abstract and Machine Translation for Japanese Publication No. 2015-163002 A, published Sep. 7, 2015, 8 pgs.
English Abstract and Machine Translation for Japanese Publication No. 2013-161995 A, published Aug. 19, 2013, 11 pgs.
English Abstract and Machine Translation for Japanese Publication No. 2006-005094 A, published Jan. 5, 2006, 7 pgs.
English Abstract and Machine Translation for Japanese Publication No. 08-107658 A, published Apr. 23, 1996, 21 pgs.
English Machine Translation for Japanese Publication No. 06-012838 U, published Feb. 18, 1994, 6 pgs.
English Machine Translation for Japanese Publication No. 58-105190 U, published Jul. 18, 1983, 3 pgs.
English Abstract and Machine Translation for Chinese Publication No. 206383066 U, published Aug. 8, 2017, 9 pgs.
English Abstract and Machine Translation for Chinese Publication No. 103537896 A, published Jan. 29, 2014, 5 pgs.

* cited by examiner

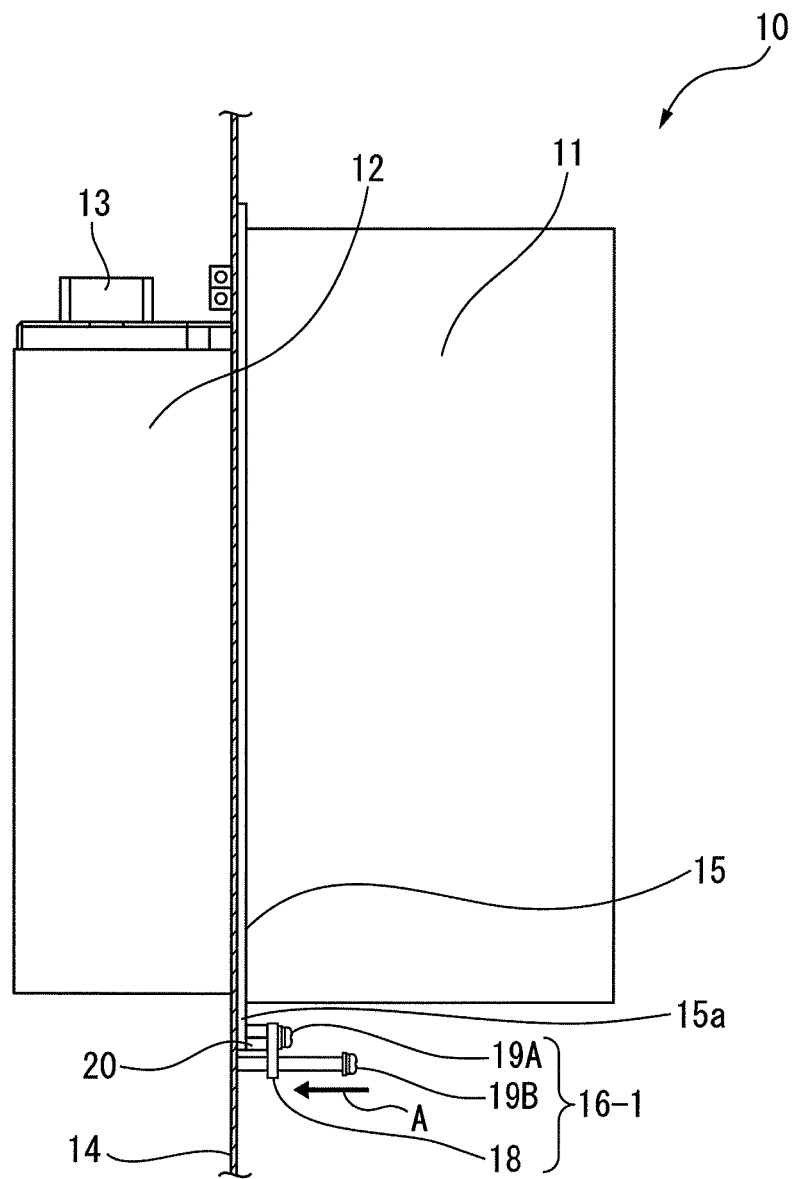

DETACHMENT TOOL AND MOTOR DRIVE DEVICE PROVIDED WITH THE SAME

BACKGROUND OF THE INVENTION

1. Field of the Invention

The present invention relates to a detachment tool for a motor drive device. In particular, the present invention relates to a tool for detaching the motor drive device from a wall portion, and the motor drive device provided with the tool.

2. Description of the Related Art

A control panel, such as a power magnetic cabinet of an NC machine tool, is provided with a motor drive device in a housing of the control panel. In general, to facilitate maintenance, repair, and the like, such a motor drive device is detachably attached to a wall portion of the housing of the control panel by a screw or the like. However, there is a case in which due to deterioration of a packing disposed between the control panel and the motor drive device and influence of a water content and a cutting fluid used for the machine tool, and the like, the motor drive device is adhesively fixed to a surface of the wall portion of the housing of the control panel. In such a case, in maintenance, repair, and the like, in detaching the motor drive device from the wall portion of the housing of the control panel, a number of processing steps and labor have been required.

Accordingly, development of a tool for easily detaching the motor drive device from the wall portion of the housing of the control panel has been desired. In this regard, Japanese Patent Application Laid-open No. 2006-061941 and Japanese Patent Application Laid-open No. 2004-200662 disclose detachment tools.

FIG. 13 is a cross-sectional view illustrating a detachment tool according to Japanese Patent Application Laid-open No. 2006-061941. As illustrated in FIG. 13, a first tool 104 fixed to a wall portion 103 of an attachment portion 102 into which a rivet 101 is attached and a second tool 106 into which a screw 105 is fixed are screw-engaged with each other. Further, the screw 105 is screw-engaged with the rivet 101. By pulling the rivet 101 together with the screw 105 in a direction of the arrow P in FIG. 13 while detaching the second tool 106 from the first tool 104, the rivet 101 is detached from the attachment portion 102.

FIG. 14 is a side view illustrating a detachment tool according to Japanese Patent Application Laid-open No. 2004-200662. As illustrated in FIG. 14, a connector 202 is attached to an end portion of a printed board 201. A detachment tool 200 for the connector 202 includes: a slender handle 203; and a pair of head portions 204, 205 that is provided at a tip end of the handle 203 and sandwiches the connector 202. When the connector 202 is sandwiched between the pair of head portions 204, 205 and then the handle 203 is moved in a direction of an arrow S in FIG. 14, the connector 202 is detached from the printed board 201 by the principle of leverage.

However, in the case of the detachment tool disclosed in Japanese Patent Application Laid-open No. 2006-061941, as can be understood from FIG. 13, the rivet 101 and the second tool 105 for detaching the rivet 101 are coaxially disposed, and thereby the rivet 101 to be detached is hidden by the second tool 105. Consequently, operational detachment is not good.

Further, the second tool 105 as described above is disposed frontward in a pulling direction of the rivet 101 so that a sufficient operation space is required in the pulling direction of the rivet 101. Consequently, as in the case of a strong electrical control panel, when various components and devices are disposed around the motor drive device, a sufficient operation space may not be secured. Thus, a detachment tool that can be flexibly adapted to a limited space has been desired.

In Japanese Patent Application Laid-open No. 2004-200662, in order to detach the connector, the principle of leverage is applied. However, depending on the degree of force for moving the handle, a part corresponding to a fulcrum of leverage may be damaged. In other words, a load applied on the part corresponding to the fulcrum cannot be managed, and hence, it is possible that when detaching the connector, force is excessively applied and thereby damage the connector.

SUMMARY OF THE INVENTION

The present invention provides a detachment tool in which operationality in detachment is good, flexible adaptation to a space can be made, and force applied in detachment is also easily managed, and a motor drive device provided with the same.

According to a first aspect of the present invention provided is a detachment tool for detaching a device attached to a wall portion, the detachment tool including: a member in which a first through hole and a second through hole are formed; a first screw that fixes the member to the device, inserted into the first through hole; and a second screw that pushes the wall portion, inserted into the second through hole, in which the second through hole is a threaded hole that screw-engages with the second screw.

According to a second aspect of the present invention provided is the detachment tool according to the first aspect as described above, in which the member includes an extension portion that extends along the second screw inserted in the second through hole.

According to a third aspect of the present invention provided is the detachment tool according to first aspect or the second aspect as described above, in which a tip end of the second screw has a curved convex shape.

According to a fourth aspect of the present invention provided is the detachment tool according to any one of the first aspect to the third aspect as described above, in which a shaft portion of the first screw includes a tip end portion that is threaded and an intermediate portion that extends between the tip end portion and a head portion of the first screw, the intermediate portion being unthreaded, and the first through hole is a threaded hole that screw-engages with the first screw.

According to a fifth aspect of the present invention provided is the motor drive device to be disposed at the wall portion of a housing of a control panel, the device including: an attachment portion having a plate shape for attaching the motor drive device to the wall portion, in which a structure having a function similar to that of the member of the detachment tool according to any one of the first aspect to the fourth aspect as described above is integrally provided to an end portion of the attachment portion.

BRIEF DESCRIPTION OF THE DRAWINGS

These objects, features, and advantages of the present invention and other objects, features, and advantages will become further apparent from the detailed description of typical embodiments of the present invention that are illustrated in the accompanying drawings.

FIG. 5A is a side cross-sectional view illustrating a first phase when the motor drive device is detached from the wall portion by the detachment tool according to the first embodiment.

DETAILED DESCRIPTION

Figure 1:
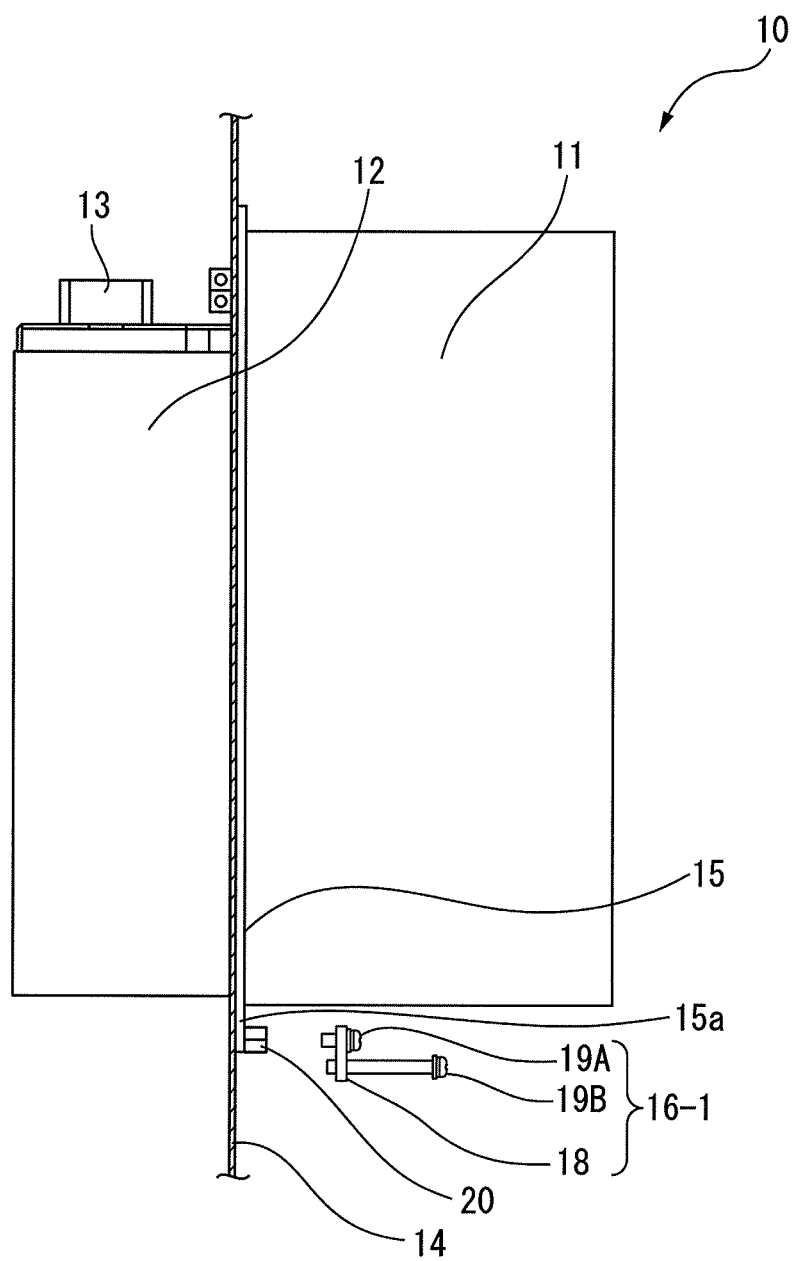
FIG. 1 is a side cross-sectional view illustrating an appearance in which a motor drive device according to a first embodiment is attached to a wall portion of a housing of a control panel.

Next, embodiments of the present invention will be described with reference to the drawings. In the drawings to be referred to, the similar members and function units will be assigned the similar reference signs. To facilitate understanding, these figures are suitably changed in scale. Further, the embodiments illustrated in the drawings are examples for carrying out the present invention, and the present invention should not be limited to the embodiments as illustrated.

First Embodiment

Figure 2:
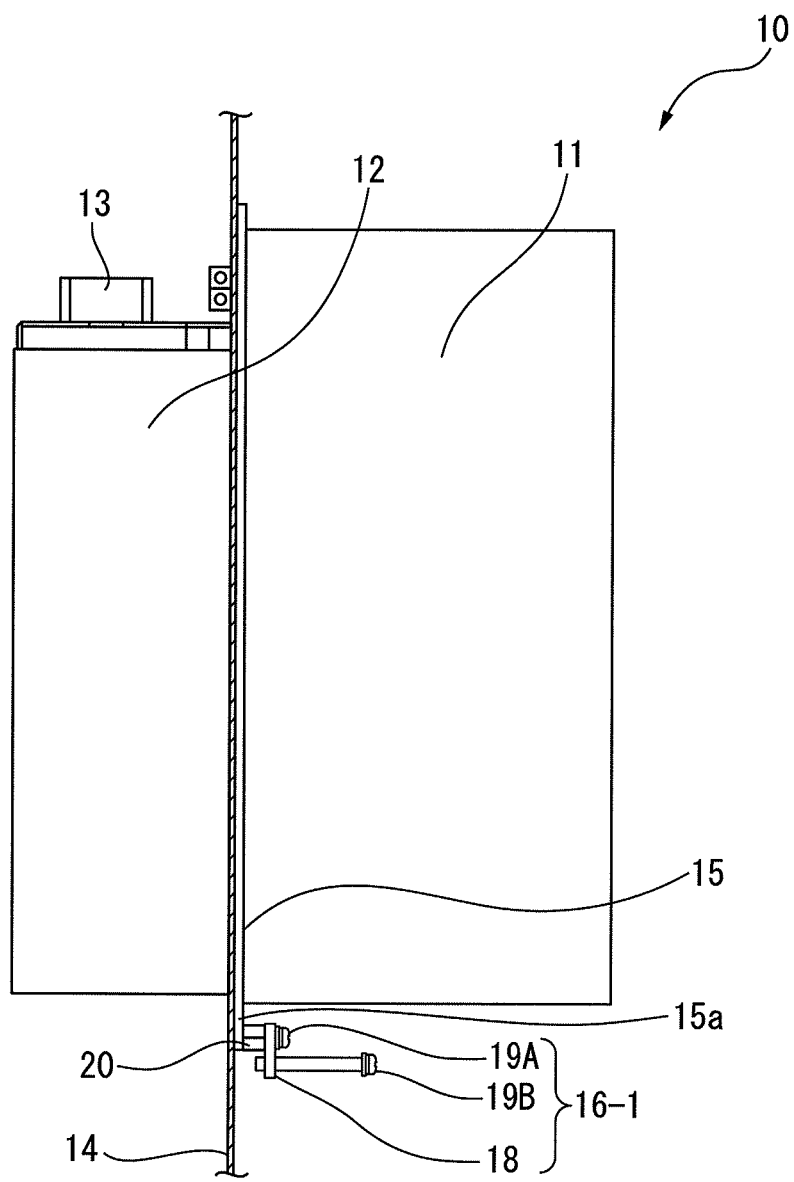
FIG. 2 is a side cross-sectional view illustrating an appearance in which a detachment tool illustrated in FIG. 1 is attached to the motor drive device.

FIG. 1 is a side cross-sectional view illustrating an appearance in which a motor drive device 11 according to a first embodiment is attached to a wall portion 14 of a housing of a control panel 10. FIG. 2 is a side cross-sectional view illustrating an appearance in which a detachment tool 16-1 illustrated in FIG. 1 is attached to the motor drive device 11. Note that in FIGS. 1 and 2, with respect to the control panel 10, only a part of the wall portion 14 of the housing is illustrated. Further, FIG. 3 is a front view of the motor drive device 11 attached to the wall portion of the housing of the control panel 10.

Figure 3:
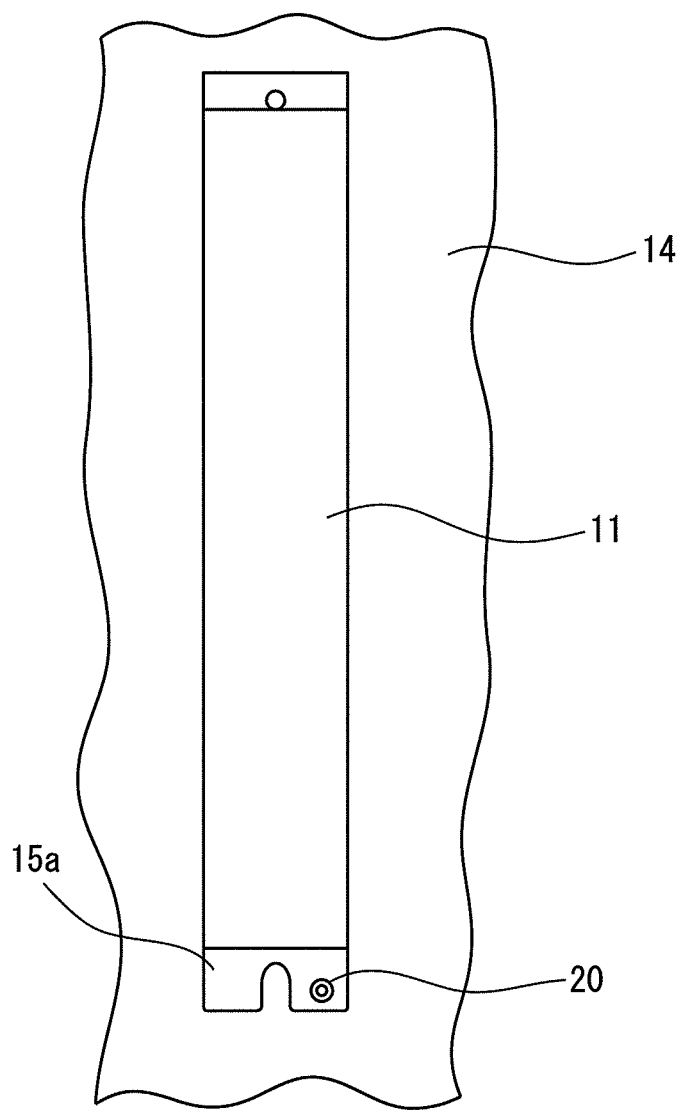
FIG. 3 is a front view of the motor drive device attached to the wall portion of the housing of the control panel.

As illustrated in FIGS. 1-3, the motor drive device 11 according to the present embodiment is disposed at the wall portion 14 of the housing of the control panel 10. The control panel 10 is, for example, a power magnetic cabinet of an NC machine tool.

The motor drive device 11 further includes a heat sink 12 that dissipates heat generated by the motor drive device 11 and a cooling fan 13 that cools the heat sink 12.

The heat sink 12 is attached to one side of the motor drive device 11. Further, the cooling fan 13 is, for example, a fan motor and disposed above the heat sink 12.

In the wall portion 14, for example, the vertical wall portion, of the housing of the control panel 10, a hole or a cutout (unillustrated) is formed.

Further, at one side of the motor drive device 11, an attachment portion 15 having a plate shape for attaching the motor drive device 11 to the wall portion 14 is provided. Then, the motor drive device 11 is attached to the wall portion 14 through the attachment portion 15. The heat sink 12 of the motor drive device 11 passes through the hole or the cutout of the wall portion 14 out of the control panel 10.

In a state in which the heat sink 12 passes through the hole or the cutout of the wall portion 14 out of the control panel 10 as described above, the attachment portion 15 blocks the hole or the cutout, and abuts on the wall portion 14.

In order to facilitate maintenance, repair, and the like of the motor drive device 11, the attachment portion 15 is detachably attached to the wall portion 14 of the housing of the control panel 10 by a screw or the like.

There is a case in which due to influence of a water content, an oil content, and the like in the air in a machine factory in which the control panel 10 is installed and deterioration of a packing, the attachment portion 15 of the motor drive device 11 as described above is adhesively fixed to a surface of the wall portion 14 of the housing of the control panel 10. Accordingly, in the motor drive device 11 according to the present embodiment, in order to easily detach the motor drive device 11 from the wall portion 14, the detachment tool 16-1 as illustrated in FIGS. 1 and 2 is prepared.

Figure 4:
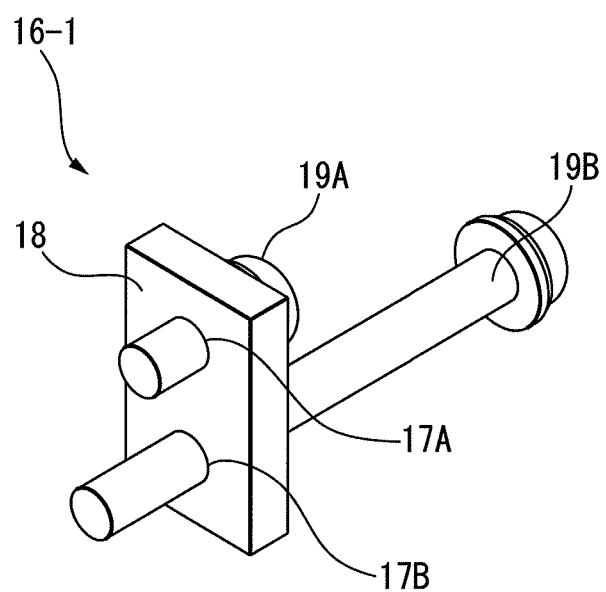
FIG. 4 is a perspective view illustrating the detachment tool alone illustrated in FIGS. 1 and 2.

FIG. 4 is a perspective view illustrating the detachment tool 16-1 alone illustrated in FIGS. 1 and 2.

As illustrated in FIG. 4, the detachment tool 16-1 of the motor drive device 11 includes a flat plate-shaped member 18 in which a first through hole 17A and a second through hole 17B are formed, and a first screw 19A and a second screw 19B that are respectively to be inserted into the first through hole 17A and the second through hole 17B. The plate-shaped member 18 is made of a metal or a resin.

The first screw 19A is a screw that fixes the plate-shaped member 18 of the detachment tool 16-1 to the attachment portion 15 of the motor drive device 11. The first through hole 17A may be a threaded hole that screw-engages with the first screw 19A or an unthreaded hole.

The second screw 19B is a screw for pushing the wall portion 14 to which the motor drive device 11 is attached. The second through hole 17B is a threaded hole that screw-engages with the second screw 19B. The second screw 19B is preferably a screw longer than the first screw 19A.

Further, as illustrated in FIGS. 1-3, the attachment portion 15 provided at one side of the motor drive device 11 includes a flange portion 15a that protrudes from an end portion of the motor drive device 11.

At the flange portion 15a, a fixture portion 20 that fixes the plate-shaped member 18 by the first screw 19A is provided. At the fixture portion 20, a threaded hole that screw-engages with the first screw 19A is provided. Note that the plurality of fixture portions 20 may be provided at the flange portion 15a.

As such fixture portion 20, an earth terminal prepared for the motor drive device 11 is preferably used. In such a case, there is an effect in which the fixture portion 20 for the detachment tool 16-1 is not required to be newly added to the motor drive device 11.

Further, as illustrated in FIG. 2, it is configured that when the plate-shaped member 18 is fixed to the fixture portion 20 of the motor drive device 11 by the first screw 19A, a tip end portion of the second screw 19B that is inserted in the plate-shaped member 18 directly faces the wall portion 14. In other words, the position of the fixture portion 20, the position and number of the first through hole 17A and the second through hole 17B, the shape of the plate-shaped member 18, and the like are determined so as to realize the above-described disposition of the second screw 19B. In addition, there may be more than one first through hole 17A and more than one second through hole 17B. If a plurality of first through holes 17A and second through holes 17B is provided at the plate-shaped member 18, attaching the detachment tool 16-1 can be flexibly carried out in response to a space in the control panel 10 and the shape of the motor drive device.

Next, with reference to FIGS. 1, 2, 5A, and 5B, a method of detaching the motor drive device 11 from the wall portion 14 by the detachment tool 16-1 according to the first embodiment will be described. Note that FIGS. 5A and 5B are side cross-sectional views illustrating first and second phases, respectively, when the motor drive device 11 is detached from the wall portion 14 by the detachment tool 16-1 according to the first embodiment.

First, as illustrated in FIGS. 1 and 2, an operator fixes the plate-shaped member 18 to the fixture portion 20 on the flange portion 15a by the first screw 19A of the detachment tool 16-1. At this time, the operator fixes the detachment tool 16-1 to the fixture portion 20 such that the tip end portion of the second screw 19B that is inserted in the plate-shaped member 18 directly faces the wall portion 14.

Figure 5B:
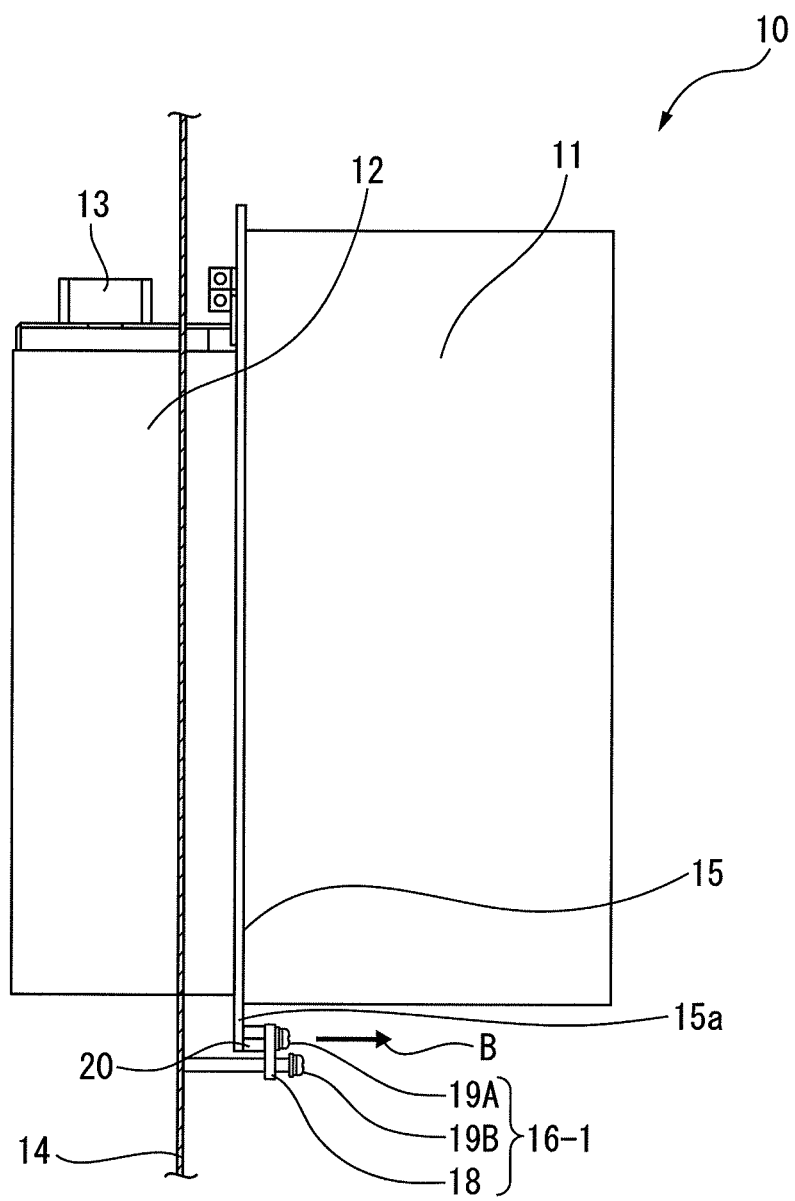
FIG. 5B is a side cross-sectional view illustrating a second phase when the motor drive device is detached from the wall portion by the detachment tool according to the first embodiment.

Subsequently, as illustrated in FIG. 5A, the operator turns the second screw 19B inserted in the plate-shaped member 18 and advances the second screw 19B in a direction of an arrow A in FIG. 5A so that the tip end portion of the second screw 19B is allowed to abut on the wall portion 14. The second screw 19B is further turned to screw into the plate-shaped member 18 so that force that moves the plate-shaped member 18 in a direction of an arrow B in FIG. 5B operates. Thereby, as illustrated in FIG. 5B, the attachment portion 15 together with the fixture portion 20 that fixes the plate-shaped member 18 move in the direction of the arrow B to be separated from the wall portion 14. In other words, even if the attachment portion 15 of the motor drive device 11 is adhesively fixed to the wall portion 14 due to influence of a water content, an oil content, and the like, the motor drive device 11 can be easily detached from the wall portion 14.

Further, according to the detachment tool 16-1 according to the first embodiment as described above, the following effects can be obtained.

The detachment tool 16-1 according to the first embodiment is configured, for example, to be fixed to the fixture portion 20 on the flange portion 15a that is located at the end portion of the motor drive device 11. However, the fixture portion 20 may be disposed not only on the flange portion 15a but anywhere on the motor drive device 11 without causing any problem. Thus, in an operation of fixing the detachment tool 16-1 to the fixture portion 20 and an operation of detaching the motor drive device 11 by the detachment tool 16-1, a restriction as to the place is small and operationality can be favorably secured.

In addition, the detachment tool 16-1 according to the first embodiment is fixed to the flange portion 15a provided to the motor drive device 11 and is thereby capable of being flexibly adapted to a space around the motor drive device 11.

Further, in the detachment tool 16-1 according to the first embodiment, force applied in detaching the motor drive device 11 can be managed by a torque of turning the second screw 19B. Consequently, in detaching the motor drive device 11, the possibility of damaging the motor drive device 11 can be decreased.

Second Embodiment

Next, a second embodiment will be described. Note that herein, the same constituent elements as those in the first embodiment are given the same signs and description thereof is omitted. Accordingly, only points different relative to the constituent elements in the first embodiment will be described below.

Figure 6:
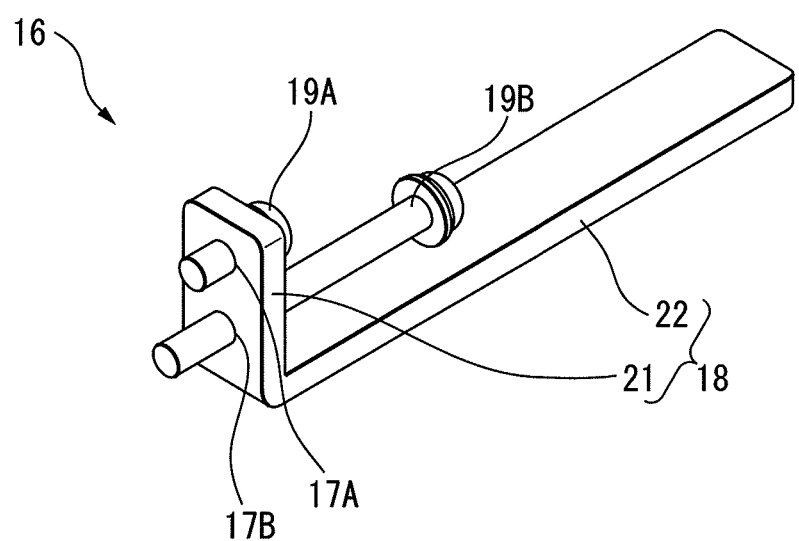
FIG. 6 is a perspective view illustrating a detachment tool according to a second embodiment.

FIG. 6 is a perspective view illustrating a detachment tool 16-2 according to the second embodiment.

In the detachment tool 16-1 according to the first embodiment as described above, the plate-shaped member 18 has a flat shape. In contrast, in the detachment tool 16-2 according to the second embodiment, as illustrated in FIG. 6, the plate-shaped member 18 is a member having a substantially L-shape. Specifically, the plate-shaped member 18 includes a first part 21 having a plate shape and a second part 22 extending in a direction substantially orthogonal to the first part 21.

In the first part 21, similarly to the first embodiment as described above, the first through hole 17A and the second through hole 17B are formed. In the first through hole 17A and the second through hole 17B, the first screw 19A and the second screw 19B are respectively inserted.

The second part 22 is disposed substantially orthogonal to the first part 21 and extends further than a position of a head portion of the second screw 19B inserted in the first part 21.

The other configurations are the same as those in the first embodiment as described above.

Figure 7A:
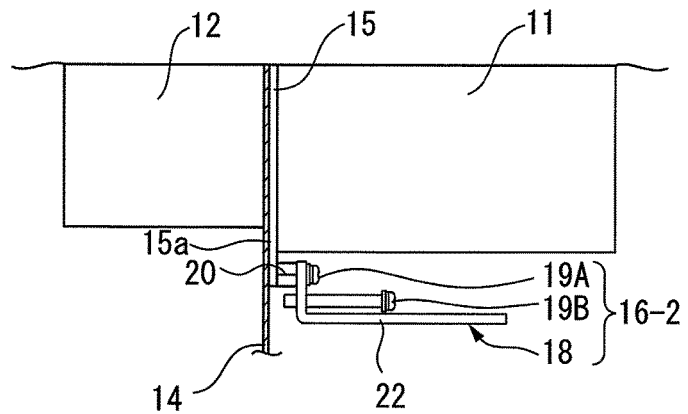
FIG. 7A is a side cross-sectional view illustrating a first phase when the motor drive device is detached from the wall portion by the detachment tool according to the second embodiment.
Figure 7B:
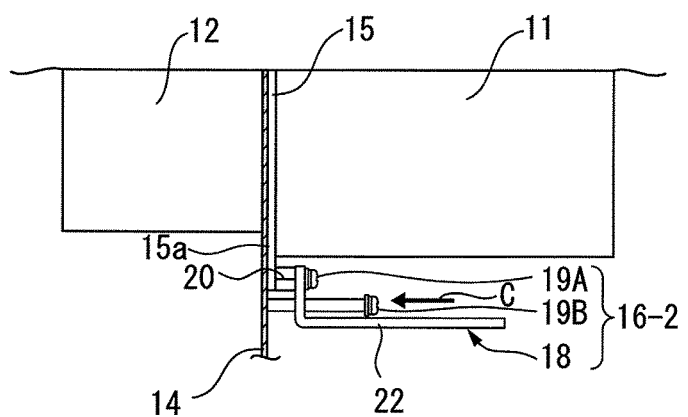
FIG. 7B is a side cross-sectional view illustrating a second phase when the motor drive device is detached from the wall portion by the detachment tool according to the second embodiment.
Figure 7C:
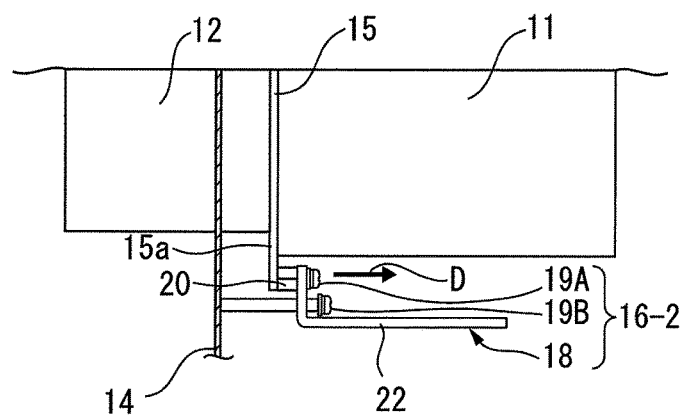
FIG. 7C is a side cross-sectional view illustrating a third phase when the motor drive device is detached from the wall portion by the detachment tool according to the second embodiment.

Next, with reference to FIGS. 7A to 7C, a method of detaching the motor drive device 11 from the wall portion 14 by the detachment tool 16-2 according to the second embodiment will be described. FIGS. 7A, 7B, and 7C are side cross-sectional views illustrating first, second, and third phases, respectively, when the motor drive device 11 is detached from the wall portion 14 by the detachment tool 16-2 according to the second embodiment. Note that in FIGS. 7A to 7C, only a surrounding area of the detachment tool 16-2 according to the second embodiment is illustrated.

First, as illustrated in FIG. 7A, the operator fixes the plate-shaped member 18 to the fixture portion 20 on the flange portion 15a by the first screw 19A of the detachment tool 16-2. At this time, the operator fixes the detachment tool 16-2 to the fixture portion 20 such that the tip end portion of the second screw 19B that is inserted in the plate-shaped member 18 directly faces the wall portion 14. In the case of the detachment tool 16-2 according to the present embodiment, the operator can hold the second part 22 as extended of the plate-shaped member 18, which facilitates an operation of fixing the detachment tool 16-2 to the fixture portion 20.

Subsequently, as illustrated in FIG. 7B, the operator turns the second screw 19B inserted in the plate-shaped member 18 and advances the second screw 19B in a direction of an arrow C in FIG. 7B so that the tip end portion of the second screw 19B is allowed to abut on the wall portion 14. The second screw 19B is further turned to screw into the plate-shaped member 18 so that force that moves the plate-shaped member 18 in a direction of an arrow D in FIG. 7C operates. Thereby, as illustrated in FIG. 7C, the attachment portion 15 together with the fixture portion 20 that fixes the plate-shaped member 18 move in the direction of the arrow D to be separated from the wall portion 14. In other words, even if the attachment portion 15 of the motor drive device 11 is adhesively fixed to the wall portion 14 due to influence of a water content, an oil content, and the like and deterioration of a packing, the motor drive device 11 can be easily detached from the wall portion 14.

According to such detachment tool 16-2 according to the second embodiment, the same effects as those of the detachment tool 16-1 according to the first embodiment as described above can be obtained.

Further, in the detachment tool 16-2 according to the second embodiment, there is the second part 22 extending further than the second screw 19B along an insertion direction of the first screw 19A and the second screw 19B so that the operator easily holds the detachment tool 16-2. Accordingly, an operation of fixing and detaching the detachment tool 16-2 relative to the fixture portion 20 of the motor drive device 11 that is fixed to the wall portion 14 is easy for the operator.

Third Embodiment

Next, a third embodiment will be described. Note that herein, the same constituent elements as those in the second embodiment are given the same signs and description thereof is omitted. Accordingly, only points different relative to the constituent elements in the second embodiment will be described below.

Figure 8:
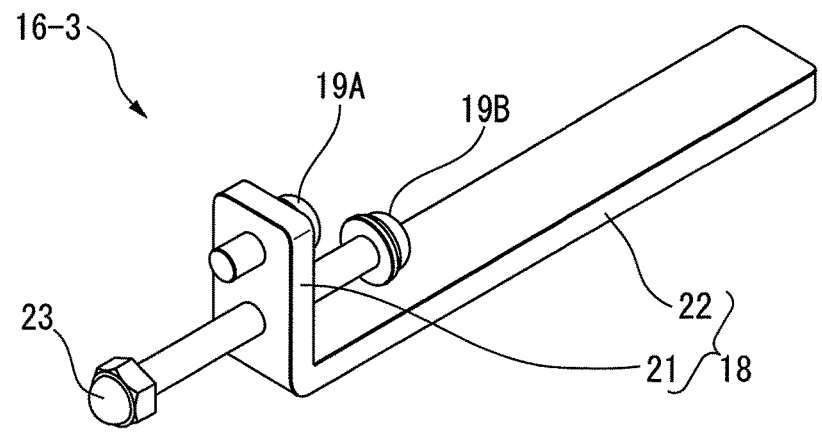
FIG. 8 is a perspective view illustrating a detachment tool according to a third embodiment.
Figure 9:
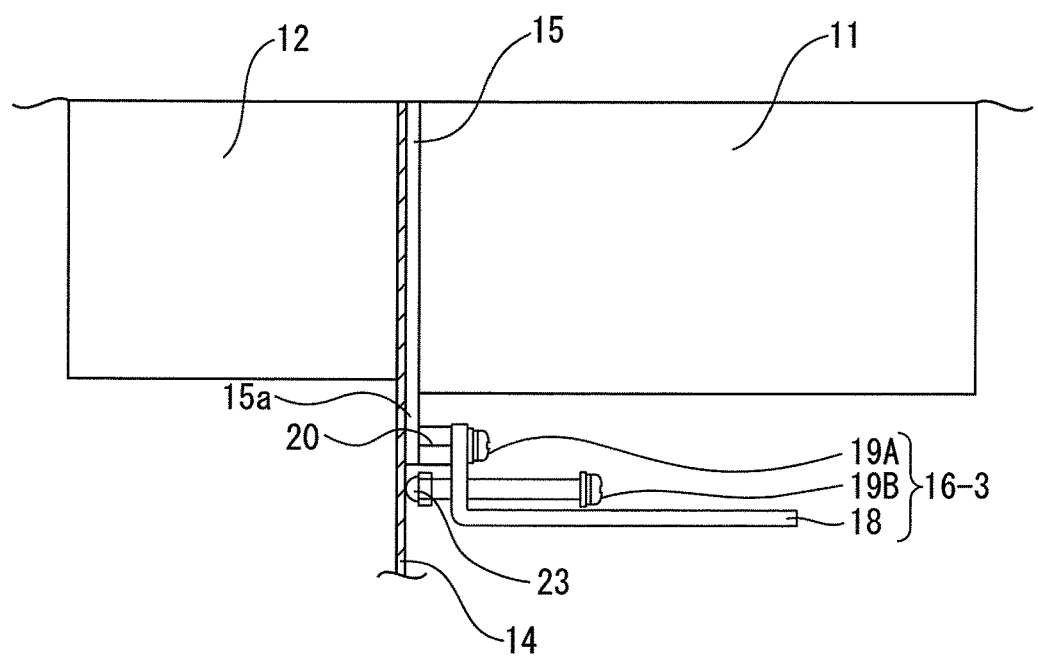
FIG. 9 is a side cross-sectional view illustrating an appearance in which the detachment tool illustrated in FIG. 8 is attached to the motor drive device.

FIG. 8 is a perspective view illustrating a detachment tool 16-3 according to the third embodiment. FIG. 9 is a side cross-sectional view illustrating an appearance in which the detachment tool 16-3 illustrated in FIG. 8 is attached to the motor drive device 11. Note that in FIG. 9, only a surrounding area of the detachment tool 16-3 according to the third embodiment is illustrated.

In the detachment tool 16-2 according to the second embodiment as described above, a tip end of the second screw 19B fails to have a curved convex shape (see FIG. 6). In contrast, in the detachment tool 16-3 according to the third embodiment, as illustrated in FIG. 8, the tip end of the second screw 19B has a curved convex shape. Such a curved convex shape is formed by providing an additional component 23 having a curved convex surface to the tip end of the second screw 19B. Alternatively, by machining the tip end of the second screw 19B, the tip end of the second screw 19B may be formed into a curved convex shape. Alternatively, instead of changing the shape, the tip end of the second screw 19B may be provided with a member made of soft material such as resin or rubber.

The other configurations are the same as those in the second embodiment as described above.

According to such detachment tool 16-3 according to the third embodiment, in detaching the motor drive device 11, as illustrated in FIG. 9, the curved convex surface of the additional component 23 at the tip end of the second screw 19B abuts on the wall portion 14. Thereby, in an operation of detaching the motor drive device 11 by turning the second screw 19B abutted on the wall portion 14, damage to the wall portion 14 can be prevented. The other effects are the same as those in the second embodiment as described above.

Note that configuring the tip end of the second screw 19B to have a curved convex shape as in the present embodiment is preferably also applied to the detachment tool 16-1 (FIG. 4) according to the first embodiment and a detachment tool 16-4 (FIG. 10) according to a fourth embodiment as described below.

Fourth Embodiment

Next, the fourth embodiment will be described. Note that herein, the same constituent elements as those in the first embodiment are given the same signs and description thereof is omitted. Accordingly, only points different relative to the constituent elements in the first embodiment will be described below.

Figure 10:
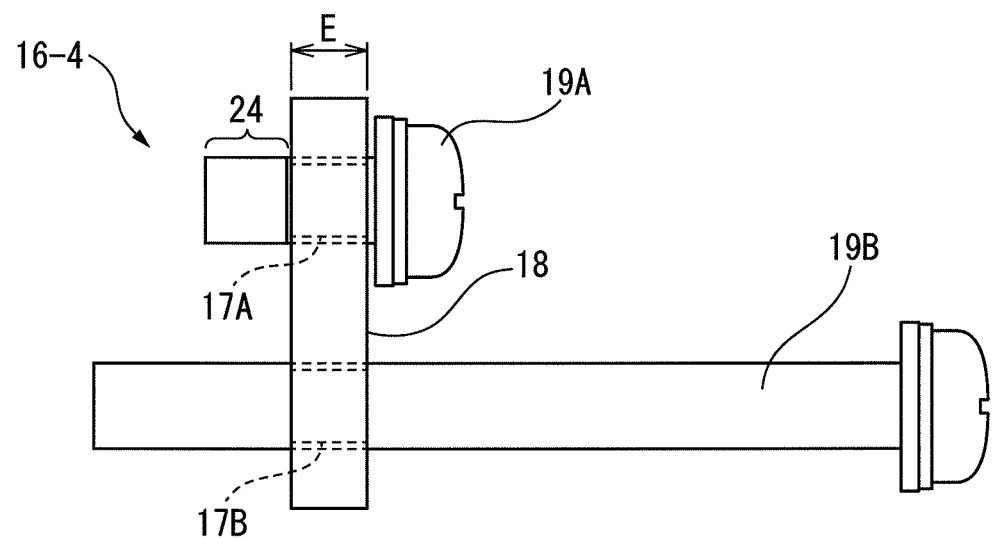
FIG. 10 is a side view illustrating a detachment tool according to a fourth embodiment.
Figure 11:
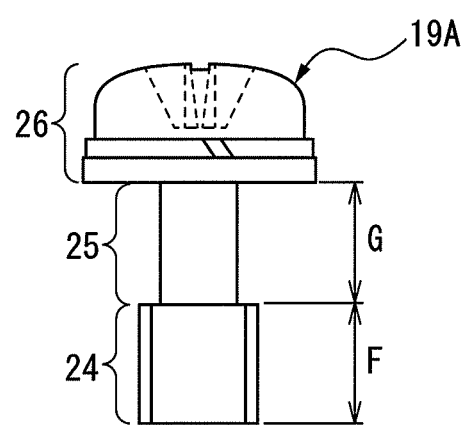
FIG. 11 is a front view illustrating a first screw used for the detachment tool illustrated in FIG. 10.

FIG. 10 is a side view illustrating the detachment tool 16-4 according to the fourth embodiment. FIG. 11 is a front view illustrating the first screw 19A used for the detachment tool 16-4 illustrated in FIG. 10.

In the detachment tool 16-4 according to the fourth embodiment, as illustrated in FIG. 10, the first through hole 17A in the plate-shaped member 18 is a threaded hole that screw-engages with the first screw 19A. Only a tip end portion 24 of a shaft portion of the first screw 19A is threaded. For example, as illustrated in FIG. 11, it is assumed that a shaft length of the tip end portion 24 of the first screw 19A is F, and a shaft length of an intermediate portion 25 extending between a head portion 26 of the first screw 19A and the tip end portion 24 is G. The intermediate portion 25 is unthreaded. In addition, the shaft length G of the intermediate portion 25 is slightly greater than a thickness E of the plate-shaped member 18, i.e. a length of the first through hole 17A (see FIG. 10).

In the configuration as described above, if the tip end portion 24 of the first screw 19A is allowed to screw into the first through hole 17A, which is a threaded hole, of the plate-shaped member 18, as illustrated in FIG. 10, the tip end portion 24 passes through the first through hole 17A of the plate-shaped member 18. Thereby, unless the tip end portion 24 is allowed again to screw-engage with the first through hole 17A, the first screw 19A fails to be pulled out of the first through hole 17A of the plate-shaped member 18. In other words, according to the present embodiment, the first screw 19A becomes unlikely to slip out of the first through hole 17A of the plate-shaped member 18.

Further, even if the first screw 19A is not screw-engaging with the first through hole 17A of the plate-shaped member 18 as described above, the head portion of the first screw 19A allows the plate-shaped member 18 to be fixed to the fixture portion 20. Thereby, an excessive load is not applied to a screw thread at a border between the plate-shaped member 18 and the fixture portion 20, and therefore the possibility of crushing the screw thread can be decreased.

In addition, threading only the tip end portion 24 of the first screw 19A as described above is preferably also applied to the detachment tools 16-1 to 16-3 according to the first to third embodiments, respectively.

In each embodiment as described above, only in detaching the motor drive device 11, the plate-shaped member 18 of any of the detachment tools 16-1 to 16-4 is fixed to the fixture portion 20 on the flange portion 15a of the motor drive device 11. However, the present invention also includes the motor drive device 11 integrally provided with a structure having a function similar to that of the plate-shaped member 18 of any of the detachment tools 16-1 to 16-4.

Figure 12:
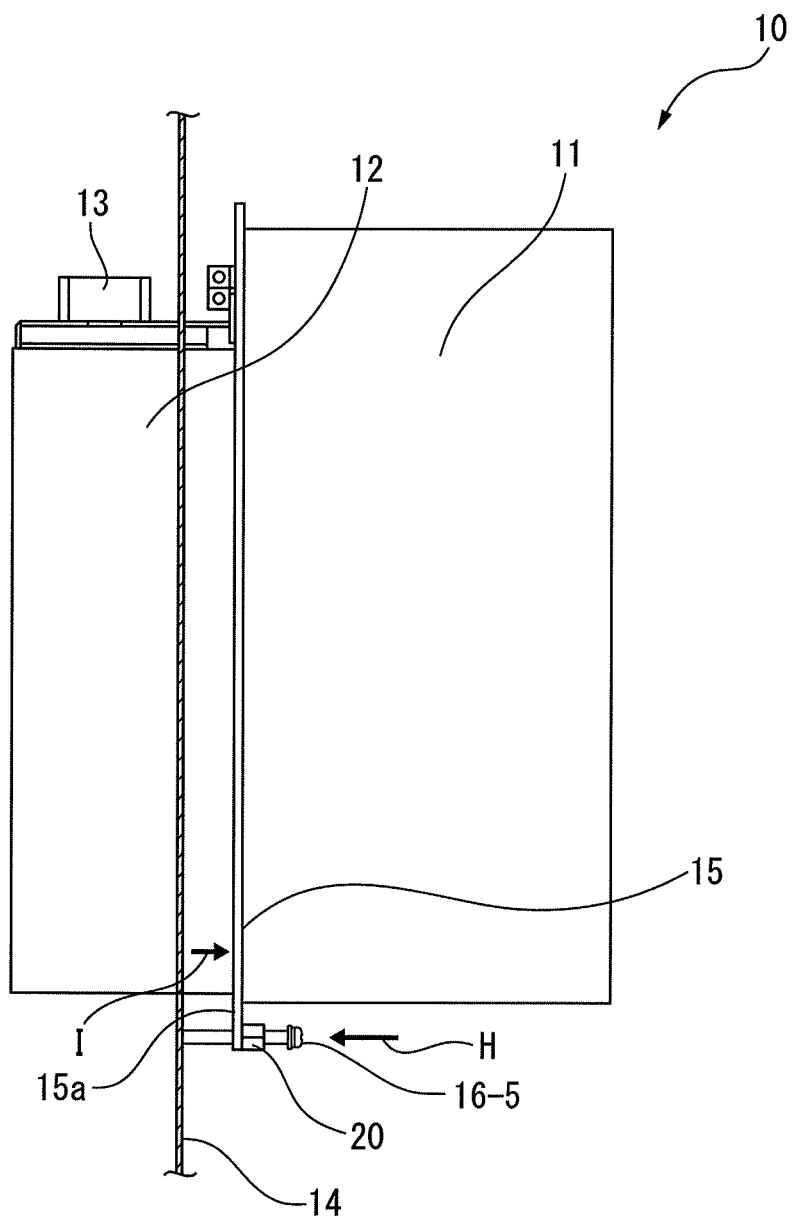
FIG. 12 is a side cross-sectional view illustrating another aspect of the motor drive device provided with a detachment tool.
Figure 13:
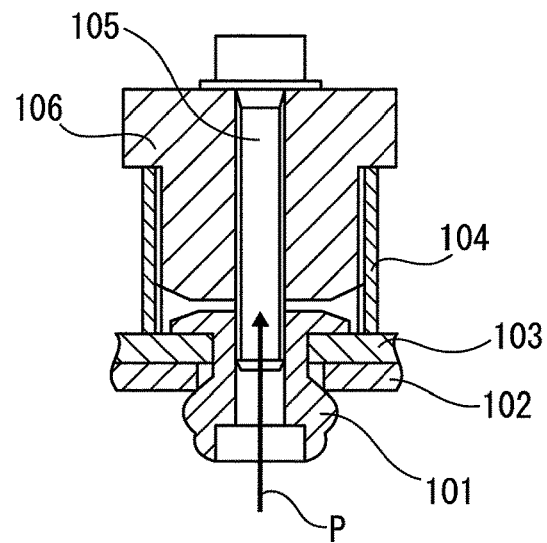
FIG. 13 is a cross-sectional view illustrating a detachment tool according to Japanese Patent Application Laid-open No. 2006-061941.
Figure 14:
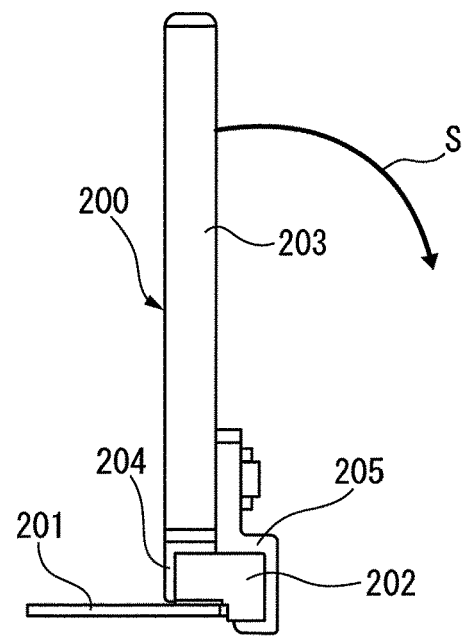
FIG. 14 is a side view illustrating a detachment tool according to Japanese Patent Application Laid-open No. 2004-200662.

FIG. 12 is a side cross-sectional view illustrating another aspect of the motor drive device 11 provided with a detachment tool. In the motor drive device 11 as illustrated in FIG. 12, a screw 16-5 is the detachment tool. The screw 16-5 directly screw-engages with a threaded hole in the fixture portion 20 on the flange portion 15a of the motor drive device 11. Further, in the flange portion 15a, a through hole (unillustrated) that communicates with the threaded hole of the fixture portion 20 is formed. Note that, the second screw 19B in the detachment tools 16-1 to 16-4 according to the first to fourth embodiments, respectively, can be applied to the screw 16-5.

In such a configuration, the operator turns the screw 16-5 inserted in the fixture portion 20 and advances the same in a direction of an arrow H in FIG. 12. Thereby, the screw 16-5 is allowed to penetrate the flange portion 15a, and a tip end portion of the screw 16-5 is allowed to abut on the wall portion 14. The screw 16-5 is further turned to screw into the threaded hole of the fixture portion 20 so that force that moves the flange portion 15a in a direction of an arrow I in FIG. 12 operates. Thereby, the attachment portion 15 including the flange portion 15a moves in the direction of the arrow I to be separated from the wall portion 14. In other words, the motor drive device 11 can be detached from the wall portion 14.

Further, in each embodiment as described above, an example in which the motor drive device 11 is attached to the wall portion 14 of the housing of the control panel 10 has been described. However, an object to be detached by the detachment tool of the present invention is not limited to the motor drive device 11 attached to the wall portion 14. In other words, the detachment tool of the present invention can be applied to all cases of detaching a device attached to a wall portion.

Although typical embodiments have been described above, the present invention is not limited to each embodiment as described above, and various modifications of each embodiment as described above in form, structure, material, and the like can be made without departing from the spirit of the invention.

Advantageous Effect of the Invention

According to a first aspect and a fifth aspect of the present invention, in an operation of detaching the device by the detachment tool, operationality in detachment is good. In other words, the detachment tool of the present invention is fixed to the end portion of the attachment portion through which the device is attached to the wall portion and is thus not disposed frontward in a pulling direction of the device. Consequently, operationality in detachment can be favorably secured.

In addition, the detachment tool according to the first aspect as described above is fixed to the device and is thereby capable of being flexibly adapted to a space around the device.

Further, in the detachment tool according to the first aspect as described above, force applied in detaching the device can be managed by a torque of turning the second screw. Consequently, in detaching the device, the possibility of damaging the device can be lowered.

In addition, according to a second aspect of the present invention, the operator can hold the part as extended of the detachment tool, and therefore an operation of fixing and detaching the detachment tool relative to the device is easy.

According to a third aspect of the present invention, the tip end of the second screw that pushes the wall portion has a curved convex shape, and therefore damage to the wall in detaching the device can be prevented.

According to a fourth aspect of the present invention, if the first screw screws into the first through hole, which is a threaded hole, and the tip end portion of the first screw is allowed to pass through the first through hole, the first screw becomes unlikely to slip out of the first through hole. Further, since the first screw does not screw-engage with the first through hole of the member, an excessive load can be prevented from applying to a screw thread while the head portion of the first screw allows the member to be fixed to the device.

The invention claimed is:

1. A detachment tool for detaching a device attached to a wall portion, the detachment tool comprising:
   a member comprising a first part and a second part, the first part having a first through hole and a second through hole, the second part being orthogonal to the first part, the second part having an extension portion;
   a first screw that fixes the member to the device, inserted into the first through hole, wherein, the extension portion extending away from the wall portion when the member is fixed to the device; and
   a second screw that pushes the wall portion, inserted into the second through hole, wherein the extension portion extends further than the second screw along an insertion direction of the first screw and the second screw to allow the detachment tool to be held during detaching,
   wherein the first and second screws each extend in the insertion direction along a same side of the second part; and
   wherein, the second through hole is a threaded hole that screw-engages with the second screw, and the second screw is longer than the first screw.

2. The detachment tool according to claim 1, wherein the extension portion extends along the second screw inserted in the second through hole.

3. The detachment tool according to claim 1, wherein a tip end of the second screw has a curved convex shape.

4. The detachment tool according to claim 1, wherein
   a shaft portion of the first screw includes a tip end portion that is threaded and an intermediate portion that extends between the tip end portion and a head portion of the first screw,
   the intermediate portion being unthreaded, and
   the first through hole is a threaded hole that screw-engages with the first screw.

5. A motor drive device to be disposed at the wall portion of a housing of a control panel, the device comprising:
   an attachment portion having a plate shape for attaching the motor drive device to the wall portion; and a member integrally provided to an end portion of the attachment portion, the member comprising a first part and a second part, the first part having a first through hole and a second through hole, the second part being orthogonal to the first part, the second part having an extension portion;

the first through hole configured to receive a first screw that fixes the member to the device, wherein, the extension portion extending away from the wall portion when the member is fixed to the motor drive device; and the second through hole configured to receive a second screw that pushes the wall portion, wherein the extension portion extends further than the second screw along an insertion direction of the first screw and the second screw, wherein, the second through hole is a threaded hole that screw-engages with the second screw, and the second screw is longer than the first screw; and wherein the first and second screws each extend in the insertion direction along a same side of the second part.

* * * * *